A. B. THAW.
ACTUATOR FOR AEROPLANE STABILIZERS.
APPLICATION FILED DEC. 20, 1915.
1,291,254.
Patented Jan. 14, 1919.
2 SHEETS—SHEET 1.
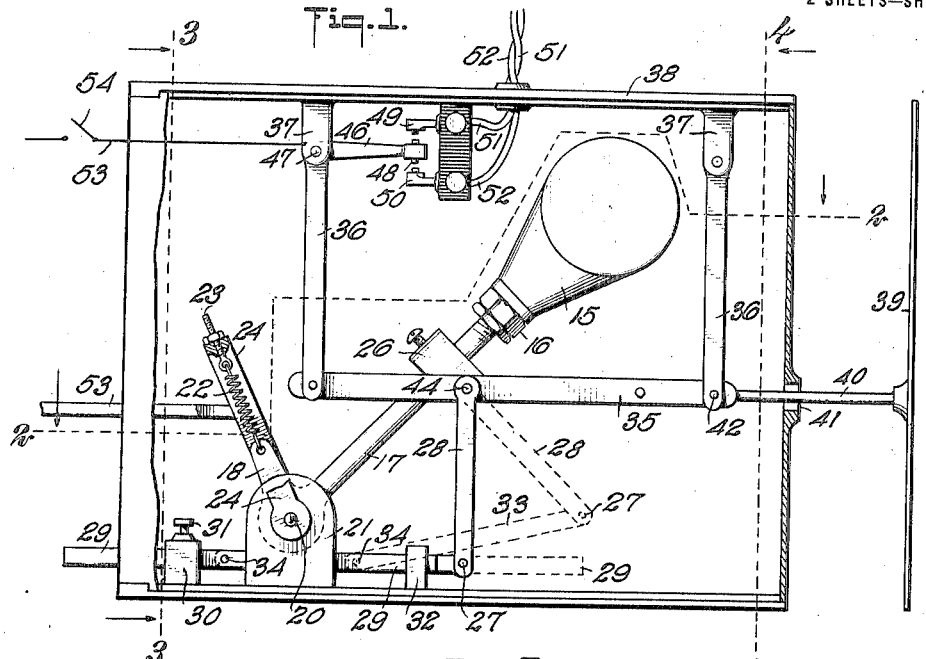
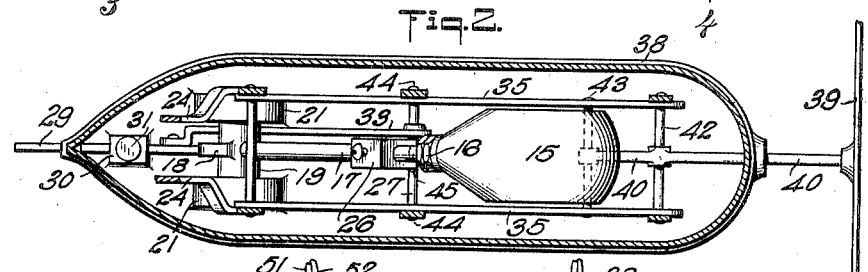
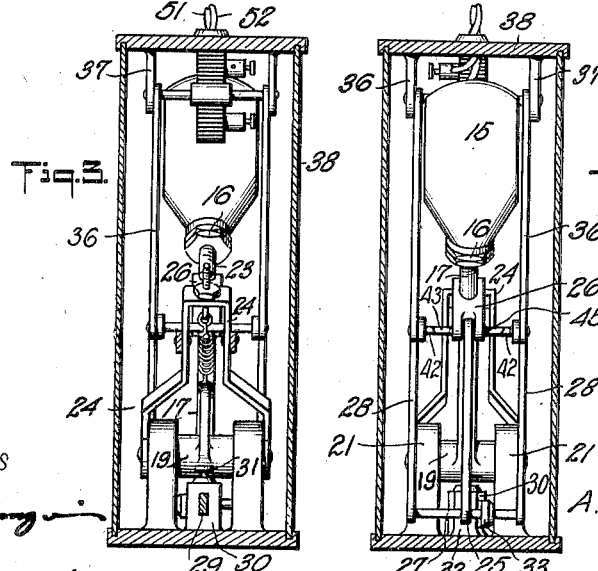
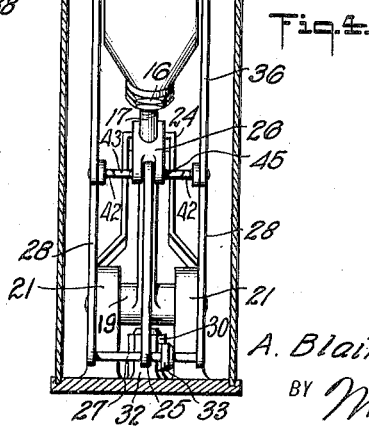
WITNESSES
INVENTOR
A. Blair Thaw
BY
ATTORNEYS

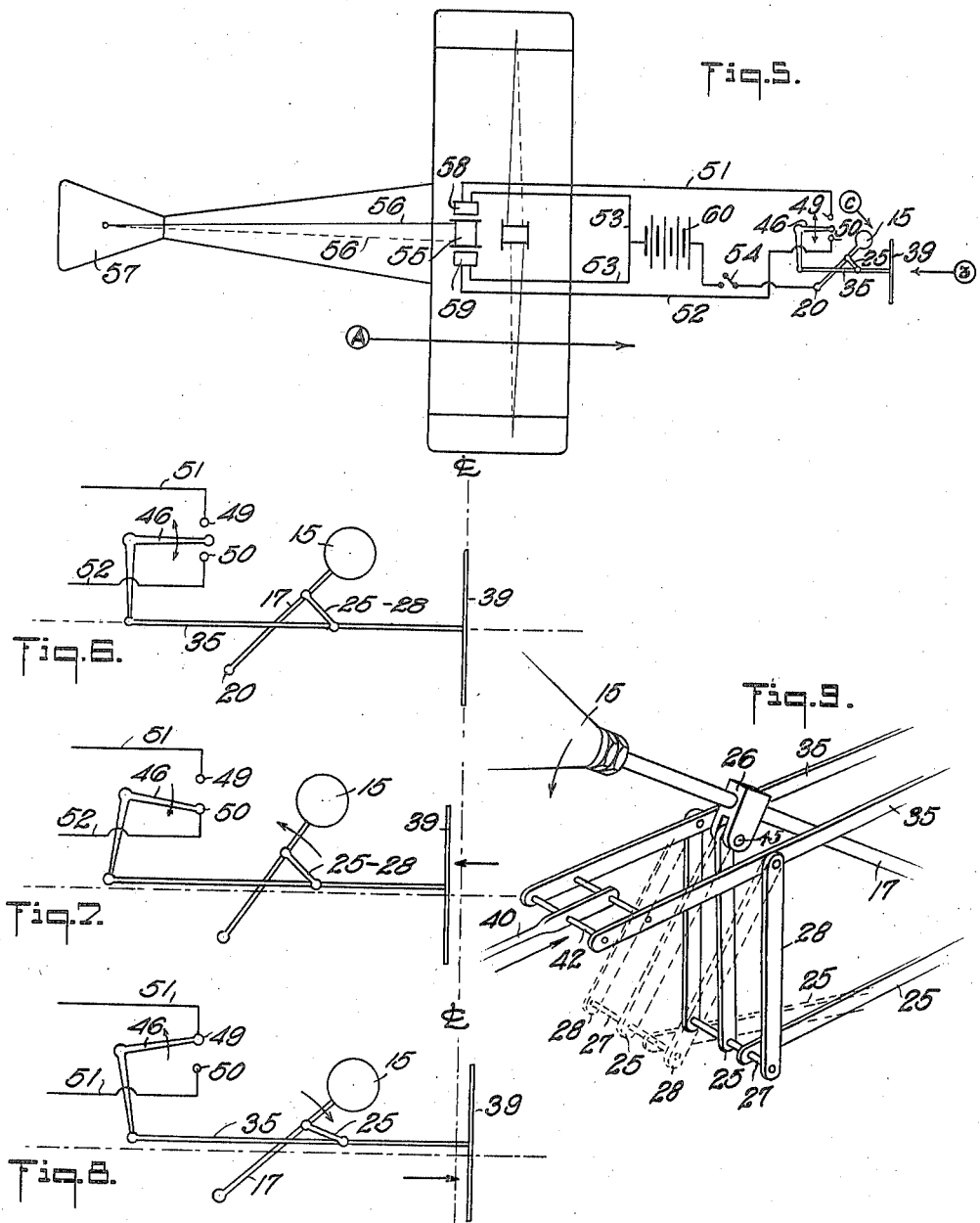

UNITED STATES PATENT OFFICE.

ALEXANDER BLAIR THAW, OF NEW YORK, N. Y.

ACTUATOR FOR AEROPLANE-STABILIZERS.

1,291,254.     Specification of Letters Patent.     Patented Jan. 14, 1919.

Application filed December 20, 1915. Serial No. 67,767.

*To all whom it may concern:*

Be it known that I, ALEXANDER BLAIR THAW, a citizen of the United States, and a resident of the city of New York, borough of Manhattan, in the county and State of New York, have invented a new and Improved Actuator for Aeroplane-Stabilizers, of which the following is a full, clear, and exact description.

Among the principal objects which the present invention has in view are: to provide an actuator for stabilizing mechanism primarily operated by inertia resulting in relative movement of two parts in a vertical plane; to provide a stability element operatively suspended by head wind pressure; to provide a stabilizer having a coöperative balanced weight member and an air-pressure member, said members being disposed in balanced relation; and to provide an actuating weighted member disposed responsive to movements of a carrying member in a vertical plane.

*Drawings.*

Figure 1 is a vertical side elevation of an actuator constructed and arranged in accordance with the present invention;

Fig. 2 is a horizontal section taken as on the line 2—2 in Fig. 1;

Fig. 3 is a vertical section taken as on the line 3—3 in Fig. 1;

Fig. 4 is a vertical section taken as on the line 4—4 in Fig. 1;

Fig. 5 is a diagrammatic view indicating an aeroplane having righting members and a power-driven mechanism for operating the same; and an actuating mechanism for said power-driven mechanism;

Fig. 6 is a diagrammatic view showing the normal relation of the static member and pressure-compensating vane, the terminals of operating electric circuits, and a floating contact operatively connected with said vane;

Fig. 7 is a diagrammatic view showing the relation of the parts above enumerated when operating to correct the action of an aeroplane when affected by a head-on gust of wind;

Fig. 8 is a similar view indicating the disposition of the parts when for any reason there is a failure of the normal head pressure;

Fig. 9 is a detail view showing in perspective the connection between the static member and the air-pressed frame, the dotted lines in said figure indicating one of the working positions of the mechanism connecting said member and frame.

*Description.*

As seen in the drawings, a static member 15 is adjustably held by a nut 16 at the end of a tilted arm 17. The arm 17 is integrally formed with a short arm 18, both arms being extended from a hub 19, the reduced ends 20 whereof are mounted in bearings formed in the standards 21. The purpose of the short arm 18 is to form an engagement member for the spring 22, the upper end of which is held by an anchor bolt 23 in the cross bar of a yoke frame 24. The yoke frame 24 extends to the outer sides of the standards 21, and is pivotally mounted on the reduced ends 20 of the arm 18.

The arm 17 is normally supported by a link 25. The link 25 is pivotally connected with a block 26, and with a coupling pin 27. The coupling pin 27 unites the link 25, links 28, and the rod 33. A bar 29, with which the rod 33 is connected, is slidably mounted in a block 30, as best seen in Fig. 3 of the drawings, and is locked in adjusted position therein by a set screw 31. The bar 29 is guided at its forward end in a block 32, as best seen in Fig. 1 of the drawings. The purpose of the bar 29 is to advance or retract the working position of the coupling pin 27. To this end, the rod 33 is pivoted to the bar 29, employing for that purpose, a pin 34.

The pin 27 is suspended from a rocking frame, having the horizontally disposed side arms 35. The side arms 35 are supported at their ends by swinging straps 36. The straps 36 are pivotally supported at their upper ends by brackets 37 integrally formed with or rigidly connected to the top of a casing 38.

The swing frame formed by the arms 35 and the straps 36, is primarily operated upon by a wind-pressure vane 39. The vane 39 is normally supported by a rod 40, which enters the casing 38 through a passage 41 therein, to be supported by pins 42 and 43 extended between the side arms 35.

When the actuator is in operative position, the vane 39 is turned in the direction of flight of the aeroplane whereon it is mounted. The resistance of the air through which it is moving, normally presses the vane and side arms with which it is connected, backward. This operation is counteracted by the static member 15, the weight whereof presses the link 25 on the pin 27, which is connected through the links 28, with the said arms 35. When the weight of the static member is thus supported by the arms 35, the movement of the arms must result in lifting the static member. The degree to which the said member is lifted, is dependent on the angle of disposition of the link 25 to the arms 35. If the bar 29 is retracted to the position shown in full lines in Fig. 1 of the drawings, it will be seen that the pin 27 is disposed directly below the rivets 44, connecting the links 28 with the arms 35 and the pin 45, which connects the block 26 and link 25, as seen best in Fig. 2 of the drawings.

When the members are so disposed, it is evident that the arms 35 will be moved a greater distance before the pin 27 is lifted, than if disposed as shown by dotted lines in Fig. 1 of the drawings. When disposed as shown by said dotted lines, the rod 33 is immediately swung on its pin 34, with the result that the static member 15 is instantly lifted or rocked on the pivot formed by the ends 20 of the hub 19.

From the foregoing it will be seen that in service the weight of the static member 15 operates to offset the normal wind pressure on the vane 39, the bar 29 being adjusted to this end. The greater the allowed wind pressure, the farther the rod 29 is advanced. When the adjustment is made, the screw 31 is manipulated to fit the same.

From this it will be seen that after adjustment and before the aeroplane with which the apparatus is connected is in flight, the weight of the static member 15 operates through the links 25 and 28 to swing the arms 35 forward, advancing the vane 39 out of its normal position. This movement of the vane 39 and arms 35 is arrested by the contact arm 46, which contact arm is rigidly connected with the straps 36 at the rear of the apparatus, and with the shaft 47 supporting the same. The arm 46 has at the end thereof, contact points 48, which engage suitable contact points on the brackets 49 and 50, forming the terminals of circuits embodying contact wires 51 and 52, respectively.

When it is desired to vary the pressure exerted by the weight of the static member 15 on the vane 39, without altering the adjustment of the bar 29, the frame 24 is rocked on its bearings to advance or re-set the operating position of the spring 22. It is evident that if said frame 24 is moved forward, the pull of the spring 22 on the arm 18 adds to the effect of the weight of the static member 15. Reversely when the frame is retracted, the pull of the spring 22 subtracts from the effect of the weight of the static member 15 on the vane 39.

The operative position of the frame 24 is manually controlled by a thrust member 53. The member 53 is of any suitable and conventional construction. I generally prefer to employ a Bowden cable, one end whereof is conveniently disposed adjacent the aviator's seat on the aeroplane on which the apparatus is mounted.

Previous to attaining the normal speed of the aeroplane, the switch 54 is opened, thereby preventing the operation of the circuits on the stabilizing mechanism.

Any suitable form of stabilizing mechanism wherein righting members are adjusted to vary air pressures for establishing the equilibrium of an aeroplane, may be used in connection with the actuator herein disclosed. The stabilizing mechanism preferred by me is disclosed in Letters Patent granted to me by the United States for improvements in stabilizers for aeroplanes, under date of January 25, 1916, numbered 1,169,695, to which Letters Patent cross reference is here made.

In Fig. 5 of the drawings is shown a drum 55, whereon a cable 56 is wound. Two extensions of the cable 56 are connected with a tail plane 57, the dotted lines indicating said cable being used to show that the extension of the cable is below the body of the aeroplane and tail plane 57. Suitable mechanism for actuating the drum 55 successively in relatively opposite rotary directions is employed. Electro-responsive devices, such as motors 58 and 59, are employed for determining which rotary direction the drum 55 shall take, and to this end, the said responsive devices are incorporated in circuits, both including an electric source 60 and the terminals on the brackets 49 and 50, respectively. Suitable mechanism for continuously rotating the devices 58 and 59 may be employed. That preferred by me embodies an electric motor operatively attached to the devices 58 and 59 to rotate the same in opposite directions, said motor being driven by means of a storage battery of suitable type carried in the aeroplane.

It will be understood that the present apparatus is employed more particularly for maintaining longitudinal stability in the aeroplane equipped therewith. For this reason, the drum 55 is operatively connected with the plane 57 only, a separate drum and connections therefor with ailerons are shown in the drawings without designating numerals or further reference thereto.

*Operation.*

When an aeroplane is equipped with stabilizing mechanism having the drum 55 and cable 56, arranged substantially as indicated herein, the operation is as follows: The aeroplane having attained its normal speed, the aviator closes the switch 54. The air pressure on the vane 39 at this rate of speed and under normal conditions maintains the member 15 in position where the arm 46 is disengaged from both the brackets 49 and 50. Until the air pressure on the vane 39 is changed, the contact arm 46 remains poised between the brackets 49 and 50.

If while flying, a wind gust directly ahead strikes the aeroplane, the immediate effect is to reduce the ground speed of the aeroplane. This effect is in part overcome by the stability of the member 15, which being heavy, continues its movement forward. The forward movement of the member 15 thrusts the link 25 and the pin 27 forward moving the side arms 35 and the vane 39 connected therewith in a forward direction or in the direction in which the aeroplane has been traveling. Under normal conditions, the effect of the diminution of head pressure on the vane 39 and the relative advance of said vane by the member 15 react with the result that the arm 35 and vane 39 are held in the position shown in Fig. 1, and the contact arm 46 remains disengaged from the brackets 49 or 50.

If the gust strikes the aeroplane so that the same is levitated, the effect of the inertia on the member 15 is further augmented due to the vertical movement of the aeroplane and the consequent corresponding direction of inertia exerted by the member 15. The immediate result of this would be to move the vane 39 forward, overcoming the air pressure thereon, so that the contact arm 46 engages the bracket 49, with the result, as hereinafter described, of correcting or reestablishing the plane of flight.

If the head pressure is for any reason suddenly reduced, the vane 39 would be moved by the member 15 in a forward direction, with the result that the arm 46 would make contact with the bracket 50. As arranged, this contact would cause the aeroplane to climb. This does not, however, occur as the reduction of pressure in front of the aeroplane induces an immediate increment in the speed thereof, which operates on the member 15 to draw the same backward, thereby compensating for the lack of pressure in front, with the result that the arm 46 is held away from the bracket 49.

If, through inattention, the speed of the aeroplane is reduced to a dangerous point, the pressure on the vane 39 would be reduced and the member 15 would be allowed to advance the said vane, and thereby lift the arm 46 in contact with the bracket 49. This would complete a circuit, which would dispose the tail plane 57 in a way to dip the machine, as in volplaning. This results immediately in an increase of speed and a corresponding increase of pressure on the vane 39, when the side arms 35 would be forced backward until the arm 46 engaged the bracket 50. A circuit would then be established through the wire 52, which would result in operating the tail plane 57, to point the aeroplane upward, until the reduced speed incident to the climb would relieve the pressure on the vane 39, and permit the member 15 to move the same until the arm 46 rests between the brackets 49 and 50.

It will be noted that an aeroplane in flight has two actions: the one lifting, the other dropping, and when a gust strikes in front, the aeroplane ascends in a vertical direction even before being pointed to climb. The reverse effect results in equal degree when head pressure is suddenly diminished.

By poising the weighted static member in an extended position, it is made sensitive to the actions of the aeroplane as above mentioned. As these actions are almost invariably precessive to the pointing up or pointing down of the aeroplane, their effect on the stabilizing mechanism is to time the action of the same slightly in advance of the movement of the aeroplane, and prevents, rather than corrects, any instability in flight of the same.

*Claims.*

1. An apparatus as characterized comprising a plurality of separated electric terminals; a circuit terminal for selectively engaging said electric terminals; a weighted member suspended at an angle to the horizontal for normally maintaining said circuit terminal in spaced relation to said electric terminals; and air-pressed means connected with said weighted member for suspending the same.

2. An apparatus as characterized comprising a plurality of separated electric terminals; a circuit terminal for selectively engaging said electric terminals; a weighted member suspended at an angle to the horizontal for normally maintaining said circuit terminal in spaced relation to said electric terminals; air-pressed means connected with said weighted member for suspending the same; and auxiliary supporting means for said weighted member; and means for varying the effect on said weighted member of said auxiliary supporting means.

3. An apparatus as characterized comprising a plurality of separated electric terminals; a circuit terminal for selectively engaging said electric terminals; a weighted member suspended at an angle to the horizontal for normally maintaining said circuit terminal in spaced relation to said electric terminals; air-pressed means connected with said weighted member for suspending the same; and means for adjusting the air-pressed means for varying the operative effect thereof.

ALEXANDER BLAIR THAW.

Witnesses:
E. F. MURDOCK,
H. I. GORMAN.